(12) United States Patent
Keilegom et al.

(10) Patent No.: US 6,398,427 B1
(45) Date of Patent: Jun. 4, 2002

(54) RELOCKABLE FILM CARTRIDGE FOR PHOTOGRAPHIC FILM

(75) Inventors: Roland Van Keilegom, Mortsel; Dirk Peeters, Boom; Jozef Mostmans, Beerse, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/825,964

(22) Filed: Apr. 5, 2001

Related U.S. Application Data

(60) Provisional application No. 60/201,687, filed on May 3, 2000.

(30) Foreign Application Priority Data

Apr. 10, 2000 (EP) .............................................. 00201287

(51) Int. Cl.⁷ ............................................... G03B 17/26
(52) U.S. Cl. ....................................................... 396/518
(58) Field of Search ................... 396/517, 518, 396/519, 520, 527, 528

(56) References Cited

U.S. PATENT DOCUMENTS

| 1,098,844 | A | | 6/1914 | Schmuck |
| 3,751,253 | A | * | 8/1973 | Cohn ......................... 396/517 |
| 4,727,391 | A | | 2/1988 | Tajima et al. |
| 4,953,193 | A | * | 8/1990 | Robinson ..................... 378/162 |
| 5,712,486 | A | | 1/1998 | Soltani et al. |
| 5,823,330 | A | * | 10/1998 | Werner et al. .............. 206/232 |

FOREIGN PATENT DOCUMENTS

| EP | 0 536 813 A3 | 4/1993 |
| EP | 0 536 813 A2 | 4/1993 |
| WO | WO 92/15043 | 9/1992 |

* cited by examiner

*Primary Examiner*—David M. Gray
(74) *Attorney, Agent, or Firm*—Breiner & Breiner, L.L.C.

(57) ABSTRACT

A relockable cartridge for photosensitive media, including (a) a media-receiving tray having a media access opening, (b) a cover for covering the media access opening and (c) an openable and relockable hooks and loops seal between the cover and the tray.

4 Claims, 2 Drawing Sheets

RELOCKABLE FILM CARTRIDGE FOR PHOTOGRAPHIC FILM

This application claim benefit to provisional Ser. No. 60/201,687 filed May 3, 2000.

FIELD OF THE INVENTION

The present invention relates to packaging for photographic film. More specifically the invention is related to a relockable cassette or cartridge for medical imaging film.

BACKGROUND OF THE INVENTION

X-ray and other types of medical imaging photographic film are typically packaged in optically opaque (i.e. light tight) and photo-inert containers such as cassettes, magazines, cartridges and bags. The film must be removed from these packages and loaded into the X-ray machine, camera or other imaging device under darkroom conditions, an inconvenient procedure.

U.S. Pat. No. 1,098,844 discloses a film package which can be loaded directly into a camera, thereby alleviating the need for a darkroom. However, this package is relatively inefficient in design and requires manual manipulation to bring the film into exposure position. The package is therefore incompatible with the automatic film handling mechanism of modern imaging systems.

U.S. Pat. No. 4,727,391 discloses a package for sheet film and a loading device for the package. The package includes a tray and a flexible cover peelably attached to the tray by an adhesive. After the package is loaded into a loading device of an image recorder, the cover is peeled off, enabling a delivery equipment to access the film. The adhesive layer has an edge portion inclined to the longitudinal direction of the tray so that the cover can be peeled off easily. Packages of the type shown in this patent contain many sheets of one specific type of film. However, depending on the nature of the image being exposed, it is often necessary to load different sizes and/or types of film into the imaging device. Any unexposed film remaining within a cartridge is therefore wasted if the cartridge must be removed from the imaging device so a new cartridge bearing a different type or size of film can be inserted.

Patent application PCT/EP88/00166 discloses an automatic film-loading device for sheet film cassettes. After a cassette is inserted into an unloading and reloading station in the device, the cassette is opened and the exposed sheet of film is seized, removed and transported to a developing apparatus. The cassette is then reloaded with a sheet of film from one of a plurality of supply magazines, each containing different sizes of film. The freshly loaded cartridge is then dispensed from the device for subsequent use. Although this automatic film-loading device reduces the waste associated with the removal of unused film from an imaging device, it is a complicated and relatively expensive accessory for the imaging device.

Patent application WO 92/15043 discloses a resealable cartridge for photosensitive media, including (a) a photo-inert and optically opaque media-receiving tray having a media access opening; (b) a flexible, photo-inert and optically opaque cover for the media access opening; and (c) a photo-inert and optically opaque seal between the tray and the cover, the seal including an openable and resealable adhesive seal between at least portions of the cover and the tray.

It is evident that there is a continuing need for improved film handling systems for photographic imaging devices. In particular, there is a need for a device that conveniently enables different sizes and/or types of film to be inserted into and removed from a medical imaging device without resulting waste. The device must be relatively inexpensive to be commercially viable.

OBJECTS OF THE INVENTION

It is an object of the present invention to provide a relockable cartridge for photosensitive material, which permits the use of different sizes and/or kinds of photographic film in a photographic device such as an imaging device, in a convenient way and without waste.

Further objects of the present invention will be clear from the description hereafter.

SUMMARY OF THE INVENTION

The above mentioned objects are realised by a relockable cartridge for photosensitive media, comprising (a) a tray having a media access opening, (b) a cover for covering the media access opening and (c) an openable and relockable hooks and loops seal between the cover and the tray.

Specific features for preferred embodiments of the invention are set out in the dependent claims.

BRIEF DESCRIPTION OF THE DRAWINGS

The invention will be described by the following illustrative embodiments with reference to the accompanying drawings without the intention to limit the invention thereto, and in which.

DETAILED DESCRIPTION OF THE INVENTION

Figure 1:
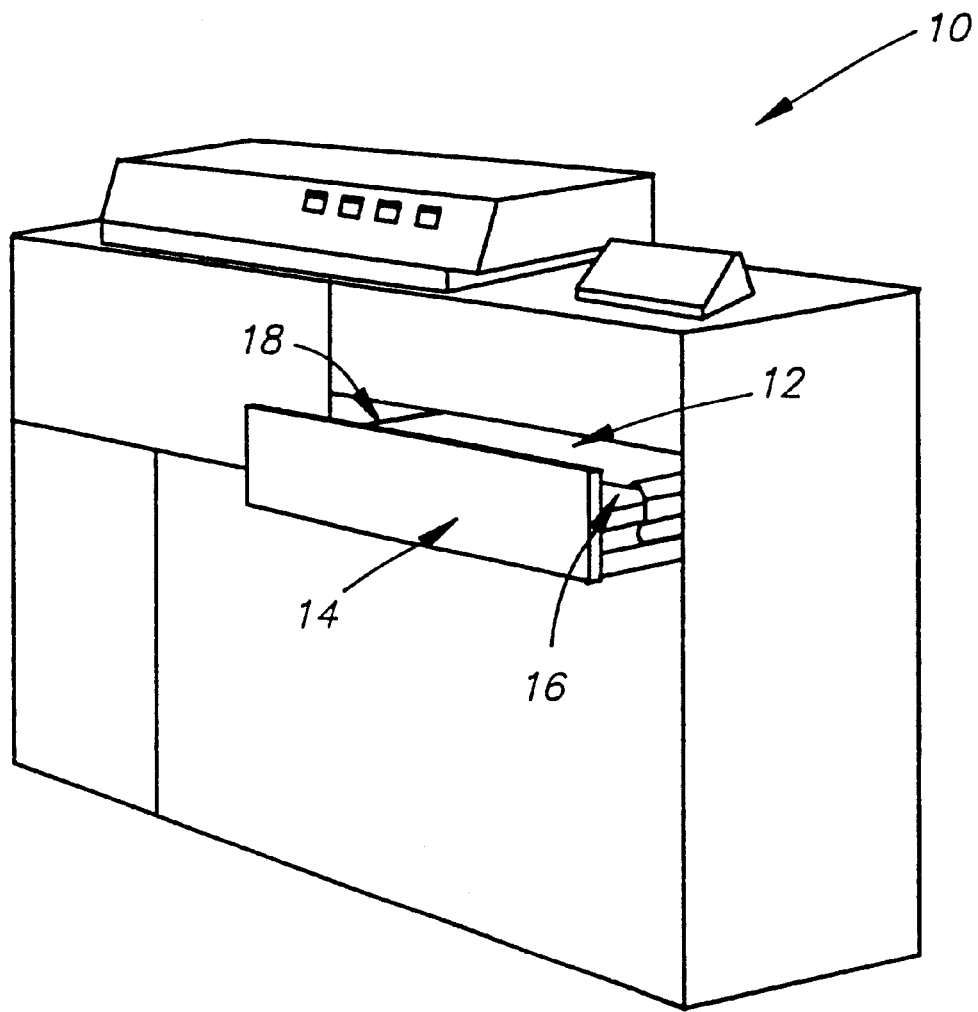
FIG. 1 shows a photographic device configured for use with a relockable film cartridge of the present invention.

FIG. 1 is an illustration of a photographic device 10 that is configured to operate with a relockable photographic film cartridge in accordance with the present invention. In the embodiment shown, photographic device 10 includes a drawer 14 which is opened to provide access to a cartridge-receiving base 16 into which film cartridge 12 is loaded. A cartridge opening/closing mechanism 18 is also mounted to drawer 14. After a film cartridge 12 has been loaded into base 16, drawer 14 is closed to lock the cartridge within a light-tight compartment. Opening/closing mechanism 18 then opens cartridge 12 to permit access to sheets of film (not visible in FIG. 1) in the cartridge. Sheets of film are removed from the opened cartridge 12 and imaged by other subsystems (not shown) of photographic device 10. The imaged film is temporarily stored in a magazine (not shown) before being removed from photographic device 10 for subsequent processing. Alternatively, the imaged film can be automatically fed to a docked or attached film developer (not shown) for processing.

Opening/closing mechanism 18 is also actuated to close cartridge 12 before the cartridge can be removed from photographic device 10. Since cartridge 12 is relockable, it can be removed from photographic device 10 before all the film within the cartridge has been exposed. Cartridges 12 with different sizes or types of film media can therefore be conveniently loaded into and removed from photographic device 10 as needed, without wasting any unused film remaining in the cartridge.

Relockable cartridge 12 can be described in greater detail with reference to FIGS. 2 and 3. As shown, cartridge 12 includes an optically opaque polymer film-receiving tray 20 and a flexible, optically opaque cover 22. Cover 22 is relockably attached to tray 20 by hooks and loops sealing strips or segments 24A, 24B, 24C on tray 20 and corresponding hooks and loops sealing strips or segments (not shown) on cover 22. The hooks and loops seal may be of the VELCRO™ type, comprising a strip of hooks on tray 20 and a corresponding strip of loops on cover 22 or vice versa. The corresponding strips of hooks and loops co-act mechanically to provide a seal between the cover and the tray that is openable and relockable.

Tray 20 is preferably moulded in one piece from a relatively inexpensive and photo-inert polyolefin material so that it is economically feasible to dispose of the cartridge following a single use. In one embodiment tray 20 is moulded from 555-ABS material, which is commercially available from the Dow Chemical Company. Polystyrene materials having appropriate characteristics may also be used.

Tray 20 is a relatively shallow member and includes a generally planar bottom wall 26, front wall 28A, rear wall 28B and side walls 28C and 28D. Front wall 28A is the wall at the front side of cartridge 12, which is the side facing opening/closing mechanism 18 in drawer 14. Rear wall 28B is opposite front wall 28A. Rear wall 28B is connected to front wall 28A by side walls 28C and 28D. Lips 30A–30D may extend outwardly from the upper edges of respective walls 28A–28D, thus circumscribing a film access opening of tray 20. Inwardly projecting guides (not shown) may be formed on walls 28A-28D to properly position sheets of film (not shown) within tray 20. Feet 34A–34D are formed into and extend downwardly from bottom wall 26 to support cartridge 12 within base 16 of photographic device 10. Bottom wall 26 also includes positioning recesses 36, which can be tapered. Positioning recesses 36 are configured to receive positioning lugs (FIG. 3) extending from base 16. The positioning lugs secure and properly orient cartridge 12 within photographic device 10. In the embodiment shown, position recesses 36 are moulded into feet 34A and 34B adjacent to front wall 28A. A media presence monitoring well 35 is also formed in bottom wall 26. Media presence monitoring sensors of photographic device 10 (not shown) extend into well 35 below the surface of bottom wall 26 when all film has been removed from tray 20.

Feet 34A and 34B (i.e. those adjacent to front wall 28A) also include ramp surfaces 38 which slope downwardly from the lower edge of the front wall to the bottom of the feet. Ramp surfaces 38 guide feet 34A and 34B over the position lugs in photographic device base 16 as cartridge 12 is being loaded into the base. The embodiment of tray 20 illustrated in FIGS. 2 and 3 also includes a recess 40 in bottom wall 26 which forms a platform on the bottom exterior of tray 20. The platform formed by recess 40 is configured to receive an information bearing medium such as a bar code which includes recorded information pertaining to the characteristics of film within cartridge 12. A pair of feet 41 are formed as recesses in bottom wall 26 adjacent recess 40 to insure proper positioning of the information bearing medium with respect to a reading device (not shown) of photographic device 10. Reinforcing ribs (not shown in FIGS. 2 and 3) can also be moulded into bottom wall 26 and/or side walls 28A–28D to increase the rigidity of tray 20.

The forwardmost or leading edge of front lip 30A also includes a series of evenly spaced cut-out sections 42. Cut-out sections 42 form a series of spaced projections 44 on the leading edge of lip 30A. Cut-out sections 42 and projections 44 co-operate with yet to be described aspects of cover 22 and opening/closing mechanism 18 to facilitate the opening and subsequent closing of cartridge 12.

Cover 22 is a flexible, photo-inert, optically opaque sheet sized to extend over the access opening of tray 20. Cover 22 has edges 23A–23D (only edges 23A and 23D are shown in FIG. 2) which extend between and mate with tray lips 30A–30D, respectively. In one embodiment, cover 22 is a foil laminate formed by polyethylene-bonded layers of 25 $\mu$m thick polyethylene, 8.75 $\mu$m thick aluminium foil and 50 $\mu$m thick polypropylene. This foil laminate cover 22 is of a sufficiently stretchy nature to prevent the cover from popping off tray 20 when cartridge 12 is flexed, yet rigid enough to prevent detrimental amounts of stretch related buckling if the cover is opened by opening/closing mechanism 18 by rolling the cover up. The foil laminate cover 22 also provides for the integrity of a vacuum within cartridge 12.

A paper or polyester reinforcing strip (not separately shown) can be added to the leading or front edge 23A of cover 22 to increase cover rigidity above projections 44 and facilitate the operation of opening/closing mechanism 18. In one embodiment, the reinforcing strip is a 6 mm wide, 150 $\mu$m thick, strip of mylar. The front edge 23A of cover 22 extends over the tray cut-out sections 42, and includes elongated apertures 46, which are positioned over the cut-out sections when the cover is sealed onto tray 20. Apertures 46 facilitate the engagement of opening/closing mechanism 18 with cover 22. Patent application WO 92/15043 describes an embodiment of an opening/closing mechanism 18 that can be used with a tray according to the invention.

Optionally, the cover is welded to the tray, or sealed to it in another, non-relockable manner. The weld or seal may serve to fasten the cover to the tray during transport; when the tray is first opened, this weld or seal is broken.

The invention is not limited to the embodiments described above. Preferably, tray 20 and cover 22 are optically opaque and photo-inert, but this is not absolutely required. In a preferred embodiment, cover 22 is flexible so that it can be rolled up by opening/closing mechanism 18, but the flexibility is not really required either—another type of opening/closing mechanism, as known in the art, may be foreseen. FIG. 2 shows hooks and loops sealing strips 24A, 24B and 24C on tray 20. In another embodiment, a hooks and loops seal is attached to tray 20 and a corresponding hooks and loops seal is attached to cover 22, arranged and positioned so that both seals can co-act mechanically to seal the cover to the tray.

In a preferred embodiment, tray 20 has a first surface 50A, 50B, 50C, 50D (see FIG. 2) for contacting cover 22 and a hooks and loops seal is provided on at least a portion of this surface 50A–D. Cover 22 has a second surface for contacting this first surface 50A–D when the tray is closed; a corresponding hooks and loops seal is provided on at least a portion of this second surface.

Preferably, a hooks and loops seal is provided on at least a portion of surface 50A, which is the front portion of surface 50A–D, while a corresponding hooks and loops seal is provided on at least a portion of the second surface of cover 22 that corresponds to surface 50A (i.e. that contacts surface 50A when tray 20 is closed). A hooks and loops seal may be provided on at least a portion of one or of both side surface portions 50C and 50D and on the corresponding portions of the second surface of cover 22. Usually, rear surface 50B will be sealed non-relockably (e.g. by means of welding) to cover 22; however, a hooks and loops seal may also be located on surface 50B and on the corresponding portion of the second surface of cover 22.

Preferably, the hooks and loops seal includes a tape of hooks on the first surface 50A–D of the tray and a tape of loops on the corresponding second surface of the cover. Especially if a hooks and loops seal is applied to one or more side surface portions 50C, 50D, it is preferred that the tape of loops is applied to the corresponding surface portions of the cover. This is advantageous if the cover is opened by rolling it up.

An advantage of a hooks and loops seal is that the operation of opening and relocking such a seal is less sensitive to dust and dirt than in case of an adhesive seal.

In addition to a hooks and loops seal between the cover and the tray, a relockable magnetic seal between the cover and the tray may be provided, as disclosed in European patent application No. 96 20 3076 filed on Sep. 14, 1998. In a preferred embodiment, such a magnetic seal is located on at least a portion of one or of both side surface portions 50C and 50D of the tray and on the corresponding portions of the second surface of cover 22.

The hooks and loops seal may be shaped like long continuous strips that are attached to the cover and to the tray (e.g. one strip may be attached to front surface portion 50A, along the complete length of front wall 28A). The seal may also be shaped like a series of short, discontinuous segments, interrupted by zones where no seal is provided. Preferably, the hooks and loops seal is shaped like long, continuous strips.

Preferably, the hooks and loops seal strips are substantially rectangular and have a width w, i.e. the dimension smaller than the length of the strips, which is not larger than 20 mm, preferably smaller than 15 mm, more preferably smaller than 10 mm and most preferably smaller than 7 mm.

Figure 2:
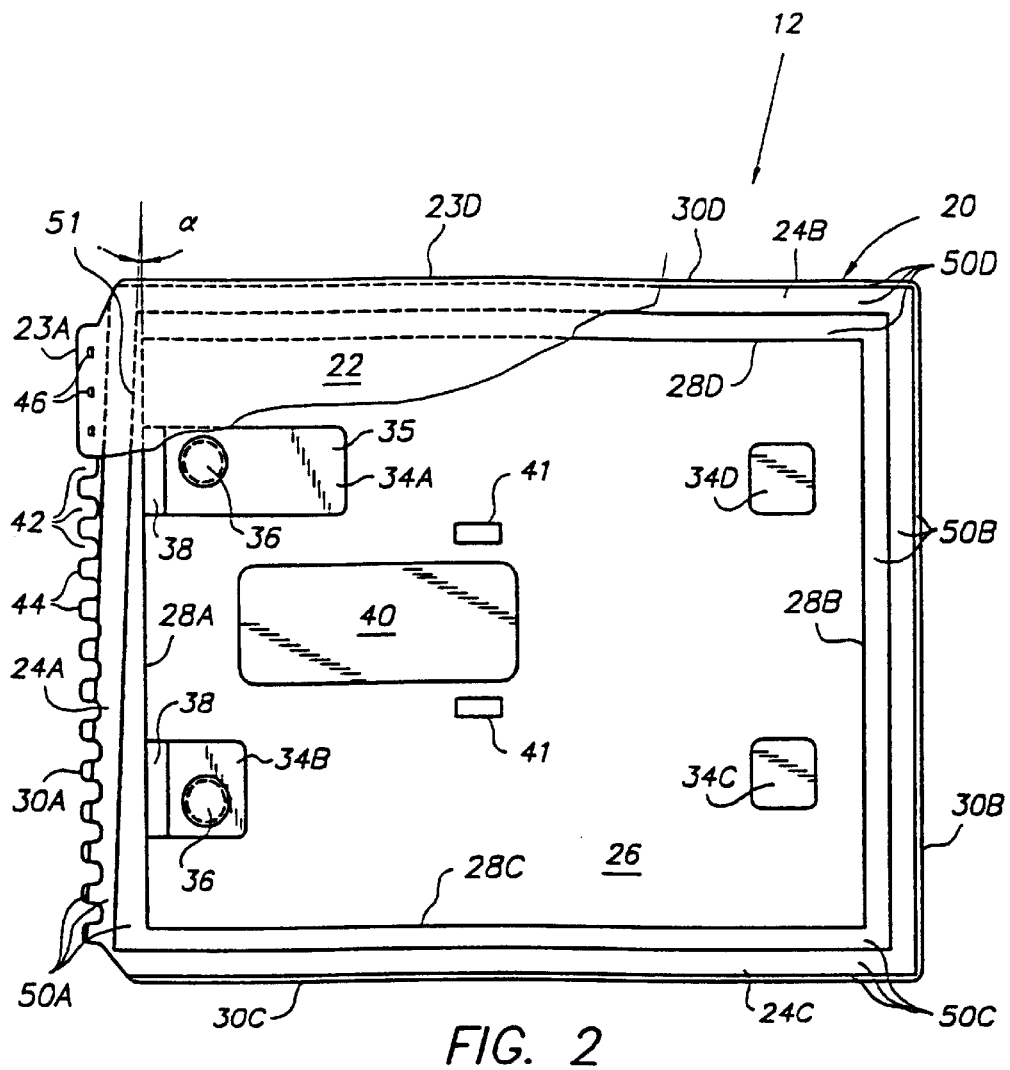
FIG. 2 is a top view of a relockable film cartridge in accordance with the present invention, with a portion of the cover broken away.
Figure 3:
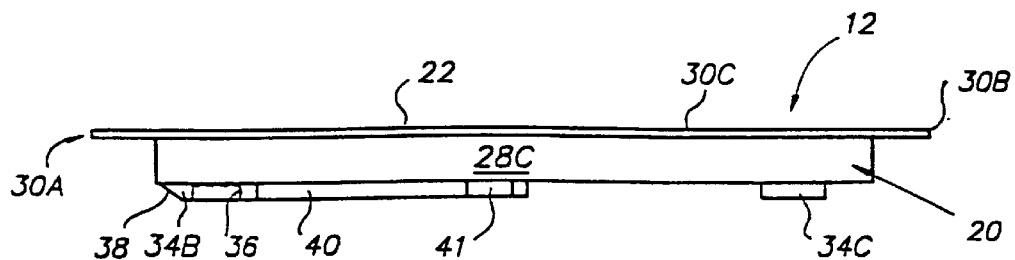
FIG. 3 is a side view of the cartridge shown in FIG. 2.

Tray 20 may have a substantially rectangular shape, as shown in FIG. 2. Tray 20 may have a width of approximately 0.4 m and and a length of approximately 0.5 m. When cartridge 12 is placed in photographic device 10, it is preferred that the hooks and loops seal on the front surface portion 50A is slightly inclined with respect to opening/closing mechanism 18 so that the hooks and loops seal is gradually opened, as is explained now. Suppose for instance that a strip of hooks and loops seal would not be provided inclined but parallel to opening/closing mechanism 18—e.g. parallel to a roller of this mechanism upon which the cover is to be rolled up. In that case, the hooks and loops seal is opened over its whole length at the same time, so that a large force is required to open the seal. If the seal is inclined with respect to the opening/closing mechanism, only a portion of the seal, namely the portion closest to the mechanism, will be opened first and gradually also the rest of the seal will be opened. Thus, it takes longer to open the seal but the opening force is smaller, which has the advantage of causing fewer shocks.

Inclining the hooks and loops seal on the front surface portion 50A with respect to opening/closing mechanism 18 may be realised, as shown in FIG. 2, by inclining the front tray surface portion 50A over an angle $\alpha$. The front tray surface portion 50A has a length axis 51 parallel to the direction along which a strip of hooks and loops seal is applied to surface 50A. This length axis 51 makes an angle a with front wall 28A. Preferably, $\alpha$ is larger than 0.5° and smaller than 10°, more preferably $\alpha$ is larger than 1° and smaller than 5° and most preferably a is larger than 1° and smaller than 3°.

Having described in detail preferred embodiments of the current invention, it will now be apparent to those skilled in the art that numerous modifications can be made therein without departing from the scope of the invention as defined in the appending claims.

What is claimed is:

1. A relockable cartridge for photosensitive media, comprising:

a rigid optically opaque media-receiving tray having a media access opening, a front tray surface portion and a first and a second side tray surface portions adjoining said front tray surface portion, said front tray surface portion and said first and said second side tray surface portions surrounding said media access opening;

a flexible optically opaque cover for covering said media access opening, said cover having a front cover surface portion for contacting said front tray surface portion and a first and a second side cover surface portions for contacting said first and said second side tray surface portions; and a hooks and loops seal between said cover and said tray; wherein said hooks and loops seal forms a light-tight seal and is located on at least a portion of said front tray surface portion and a portion of said front cover surface portion, on at least a portion of said first side tray surface portion and a portion of said first side cover surface portion, and on at least a portion of said second side tray surface portion and a portion of said second side cover surface portion.

2. The relockable cartridge according to claim 1 wherein said hooks and loops seal has a width of less than 20 mm.

3. The relockable cartridge according to claim 1 wherein said hooks and loops seal comprises a tape of hooks located on said front tray surface portion of said tray and a tape of loops located on said front cover surface portion of said cover.

4. The relockable cartridge according to claim 1 wherein said tray has a front wall and wherein said front tray surface portion has a length axis making an angle a with said front wall that is larger than 0.5° and smaller than 10°.

* * * * *

UNITED STATES PATENT AND TRADEMARK OFFICE
CERTIFICATE OF CORRECTION

PATENT NO.    : 6,398,427 B1
DATED         : June 4, 2002
INVENTOR(S)   : Roland Van Keilegom et al.

It is certified that error appears in the above-identified patent and that said Letters Patent is hereby corrected as shown below:

Column 6,
Line10, "a" should read -- α --.
Line 53, "angle a" should read -- angle α --.

Signed and Sealed this

Fourth Day of February, 2003

JAMES E. ROGAN
*Director of the United States Patent and Trademark Office*